May 25, 1965    W. G. PECK ETAL    3,185,029
LINEAR ZOOM OPTICAL SYSTEM
Filed Jan. 23, 1961    5 Sheets-Sheet 1

WILLIAM G. PECK
RICHARD J. PEGIS
INVENTORS

BY Frank C. Parker
   Herman Stone

ATTORNEYS

WILLIAM G. PECK
RICHARD J. PEGIS
INVENTORS

ATTORNEYS

FIG. 14

WILLIAM G. PECK
RICHARD J. PEGIS
INVENTORS

# United States Patent Office 3,185,029
Patented May 25, 1965

3,185,029
LINEAR ZOOM OPTICAL SYSTEM
William G. Peck, Rochester, and Richard J. Pegis, Hilton, N.Y., assignors to Bausch & Lomb Incorporated, Rochester, N.Y., a corporation of New York
Filed Jan. 23, 1961, Ser. No. 84,004
5 Claims. (Cl. 88—57)

This invention relates to a novel optical system of the varifocal, or zoom type including plural movable elements, and more particularly, to a novel system of this kind in which the motions of the movable elements are all linearly related.

The principal problem in the design of zoom systems in general is encountered in the design of the so-called first order layout, and relates to image shift, i.e., to maintaining the image formed by the system at or sufficiently near a selected image plane throughout the entire zoom range of the system.

The problem has previously been solved in two principal ways. First, by arranging for complex, non-linear relationships between the motions of the different movable elements of the zoom system. Systems of this type are known as mechanically compensated systems, and although they are theoretically capable of perfect image shift compensation, they are relatively expensive because of the cost of the devices needed to achieve the complex motion relationship.

Second, a few systems have been worked out such as illustrated by the United States Patents, No. 2,566,485 to Cuvillier, and No. 2,906,171 to Bergstein, in which two interspaced sets of lenses are moved relative to each other without the requirement of complex mechanical motions among them. See also an article by Dr. R. Kingslake, entitled "The Development of the Zoom Lens" in the August 1960 issue of the Journal of the Society of Motion Picture and Television Engineers, volume 69, pp. 534–544. It is not possible to achieve a high degree of image shift compensation in such systems, but only to limit the image shift to within limits that have been found to be tolerable for many relatively non-exacting applications. Systems of this type have become known as optically compensated systems, and have found relatively wide commercial acceptance because of their low cost.

The optical system of the present invention may be regarded as merging the best features of both the mechanically compensated and the optically compensated systems of the prior art. It employs the principle of differential motions of the elements of the zoom system, as do the mechanically compensated prior art systems, but does not require complex motion relationships. All of the motions involved in the optical system of the present invention are linearly related, permitting manufacture at greatly reduced cost relative to previous mechanically compensated zoom systems. Similarly to the previous optically compensated systems, the image shift correction cannot be made perfect in theory. However, in contrast to the previous optically compensated systems, the image shift may be compensated to a relatively high degree, and may be reduced to a value that is negligible in relation to the designer's requirements.

The zoom system of the invention, therefore, is expected to have wide commercial application, because it offers substantially all of the advantages of previous mechanically compensated systems at a cost very little more than the cost of previous optically compensated systems.

The expected commercial advantages of the zoom system of the invention may be attributed primarily to the achievement of a high degree of image shift compensation using only linearly related motions of the elements of the zoom system. Accordingly, the zoom system of the invention has been denoted as a linearly compensated, or, more simply, a linear zoom system, and the term linear compensation is used throughout this specification to denote the type of image shift compensation achievable in a zoom system wherein the movable elements move at different respective linearly related rates.

Accordingly, one important object of the present invention is to provide a novel optical zoom system.

Other objects are: to provide a method of calculating first order layouts for optical zoom systems of the linearly compensated type in such a way as to achieve a relatively high degree of image shift compensation; to provide a novel optical zoom system including only linearly related motions, yet achieving a high degree of image shift compensation; and, in general, to provide a novel optical zoom system that is relatively inexpensive in construction, yet capable of providing practically any desired degree of image shift compensation.

The foregoing and other objects and advantages of the invention will become apparent in the following detailed description of representative embodiments thereof, taken in conjunction with the drawings, wherein.

Briefly, in accordance with the present invention, it has now been found that it is possible to achieve a relatively high degree of image shift compensation in an optical zoom system including only linearly related motions. Moreover, the present invention includes a relatively convenient, and easily handled mathematical method of computing first order layouts for linearly compensated zoom systems in such a way as to achieve a high degree of image shift compensation, thus providing the optical designer with a relatively simple and straightforward tool for solving what has heretofore been regarded as an almost insuperable problem.

Once the first order layout is determined in accordance with the invention, the desired aberration corrections may be computed by conventional techniques. The mathematical method of the invention is relatively flexible, and permits of many different first order layout solutions for any given set of conditions that are to be met by the system.

According to the invention, the required constructional parameters, such as focal lengths, separations, and motions in linearly compensated zoom systems, and the image shift characteristics thereof may be computed by the following procedure.

SYNOPSIS OF THEORY FOR LINEARLY COMPENSATED ZOOM SYSTEMS

This synopsis deals with a zoom optical system comprising any given number, $n$, of movable, air spaced, thin lenses in optical alignment between object and image surfaces, and follows the theory taught by Gaussian optics for a first order design.

Figure 8:
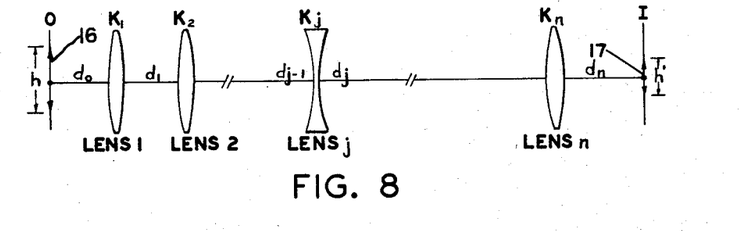
FIG. 8 is an optical diagram showing a hypothetical zoom system having any given number of movable lenses as explained hereinafter.

Pertinent definitions and notations employed herein are explained hereinafter, and diagrammed in FIG. 8 of the drawings, which shows $n$ lenses aligned on an axis joining an object surface O and an image surface I. In accordance with established convention, the separations $d_0$, $d_n$, etc. are denoted positive when measured in the direction from the object surface O toward the image surface I. The letters $K_1$, $K_2$, $K_j$, and $K_n$ denote the powers of the successive lenses, where $j=1, 2, \ldots n$.

If a small object 16 of height $h$ stands perpendicularly to the axis at the object surface O, the image 17 thereof will be a reproduction, of height $h'$ perpendicular to the axis at the image surface I. The ratio $h'/h$ is the magnification, $m'$ of the system, and $m=1/m'$ is the reciprocal magnification.

In a linearly compensated zoom system, the powers (K's), the separations ($d$'s), and the motions of the elements are so chosen that, while the magnification $m'$ changes through a desired range, the axial shift of the image 17 is limited to a tolerably small value, in view of the use for which the system is intended.

The computation according to the invention makes use of a mathematical parameter, $u$, to define the motions of the various movable elements of the system. The object plane O is arbitrarily selected as the reference position, and the successive separations when $u=0$ are denoted $d_0, d_1, \ldots d_j \ldots d_n$, respectively. The corresponding separations at any other position of the system, where $u \neq 0$ are represented by $D_0, D_1 \ldots D_j \ldots$ and $D_n$, respectively, which quantities may be expressed as, (1) $$D_j = d_j + p_j u$$

where $j=0, 1, 2, \ldots n$, and $p_0, p_j \ldots p_n$ are constants proportional to the total excursions of the respective separations. The range of the parameter $u$ may be arbitrarily selected, and is preferably set at 0 to 1 to facilitate the computation. When the range of $u$ is so limited, it will be seen that $D_j$ varies between $d_j$ and $$d_j + p_j$$

The values of the $d$'s, the K's, and the $p$'s, and the range of $u$ fully define any linearly compensated zoom optical system. The problem with which the invention is primarily concerned relates to the selection of optimum, or near optimum values for the constants to achieve a relatively high degree of image stability through the entire zoom range of the system.

It may be interesting to note at this point a conclusion that follows directly from the expression (1) $D_j = d_j + p_j u$. This is that in those systems wherein it is desired to maintain a constant object-to-image distance throughout the zoom range (instead of allowing the object-to-image distance to vary as a linear function of $u$) the algebraic sum of the changes in the separations must be minimized, and, ideally, reduced to zero. Mathematically, the sum of the constants $p_0, p \ldots p_j \ldots p_n$ must be reduced substantialy to zero. This follows because, as the system zooms from its starting position ($u=0$) each dependent variable $D_0, D_1 \ldots D_j \ldots D_n$ increases by the value of its corresponding $p$ constant multiplied by the instantaneous value of $u$. The image shift, i.e., the changes in the object-to-image distance is thus $u$ times the algebraic sum of the $p$ constants. As will be seen by inspection of FIG. 8, the object-to-image distance is $$\sum_{j=0}^{n} D_j = \sum_{j=0}^{n} d_j + \sum_{j=0}^{n} p_j u$$

In order to keep the value of this expression constant as the system zooms, $$\sum_{j=0}^{n} p_j$$

must be substantially zero.

It may also be noted that when all the $p$'s are of equal absolute value but alternating in sign, the system becomes a so-called optically compensated system. It will be seen from the mathematics hereinafter set forth that superior image shift compensation may be achieved by employing different motions for the various different movable elements of the zoom system. Also, the use of different motions (different values for the different respective $p$'s) permits the provision of a greater zoom range relative to the zoom range achievable in the optically compensated systems, and allows more degrees of freedom in the design of the system, with the obvious advantages resulting therefrom.

Now, in a linearly compensated zoom system, it is theoretically impossible to keep the image exactly in the desired image plane through the full zoom range. In the case where the object-to-image distance is to be kept constant, for example, although it may be possible to make $$\sum_{j=0}^{n} p_j$$

exactly equal to zero, there is still an error factor.

We have found that, if we represent the error factor, i.e., the displacement of the image from the selected image plane at any point in the motion of the system by $e'(u)$, then (2) $$e'(u) = \frac{S(u)}{M(u)}$$

where S is a polynomial of degree $n+1$ in $u$, and M is a polynomial of degree $n$ in $u$.

$S(u)$ can be chosen in such a manner that its $n+1$ roots for $S(u)=0$ (i.e., the values of $u$ when $S(u)=0$) will all lie on the interval $0 \leq u \leq 1$. This amplies that an "$n$ lens" zoom system may be constructed in such a manner that the image will be in perfect focus $n+1$ times in the course of a complete excursion of the system through its magnification range.

Figure 9:
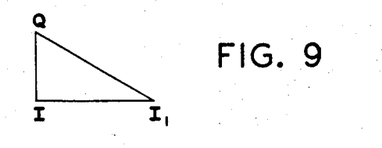
FIG. 9 is a diagram showing a detail of an optical system as explained hereinafter.

We have further found that in this relation (2) $M(u)$ is directly proportional to $m$, the reciprocal magnification, and that $S(u)$ is directly proportional to the radius of the spot at the selected image surface I caused by the defect in focus, as illustrated in FIG. 9 of the drawings, wherein $I$ = selected image point
$I_1$ = actual image point
$I - I_1 = e'(u)$ = image shift
$I - Q$ = spot radius We have also demonstrated that $e'(u)$ is related to the constants that define the zoom system by the continued fraction, $$e'(u) = -P_n u - X_n + \cfrac{f_n^2}{P_{n-1}u + X_{n-1} + \cfrac{f_{n-1}^2}{-P_{n-2}u - X_{n-2} + \cfrac{f_{n-2}^2}{\cdots \cdots \cdots + \cfrac{f_1^2}{(-1)^{n-1}(p_0 u + X_0)}}}}$$

(3)

where the focal lengths of the various lenses are represented by $f_j$, so that $$f_j = \frac{1}{K_j}$$

(4) and where $$X_0 = d_0 - f_1$$
$$X_0 = d_0 - f_1$$
$$X_j = d_j - f_j - f_j + 1 \quad (1 \leq \leq n-1 \leq$$
$$X_n = d_n - f_n$$

One of the conditions sometimes desired to be met in the design of a zoom system relates to image inversion or erection. This condition is represented conventionally by the sign of the reciprocal magnification, $m$ of the system, which, as hereinabove stated, is directly proportional to the polynomial M. It may be readily seen by inspection of the Gaussian bracket analysis hereinafter described, that in order to make the coefficient of $u^n$ in $M(u)$ positive, the following conditions must be met:

(a) When the number of lenses, $n$, in the system is even:

(1) If the product $(p_0 p_1 \ldots p_{n-1})$ is negative, there must be an odd number of lenses of negative focal length (2) If the product $(p_0 p_1 \ldots p_{n-1})$ is positive, there must be an even number of, or no negative focal length lenses;

(b) When the number of lenses, $n$, in the system is odd:

(1) If the product $(p_0 p_1 \ldots p_{n-1})$ is negative, there must be an even number of, or no negative focal length lenses, and (2) If the product $(p_0 p_1 \ldots p_{n-1})$ is positive, there must be an odd number of negative focal length lenses.

When the coefficient of $u^n$ in $(Mu)$ is to be negative, obviously the conditions above for $n$ even and odd are reversed.

The foregoing information is utilized to design the first order layout of a linearly compensated zoom system having any given number, $n$, of lenses. The steps in the computation are as follows: The magnification range is determined by the designer in view of the requirements of the apparatus in which the zoom system is to be used. For present purposes, the magnification range is regarded as an arbitrarily chosen number. The number of lenses to be included in the system will be chosen on the basis of the degree of image shift compensation and aberration correction desired, and cost considerations, with the realization that each added lens enables the achievement of a relatively large increase in compensation and correction.

GENERAL COMPUTATION STEP NO. 1

The magnification range and the number, $n$, of lenses having been selected, construct a polynomial $M(u)$ of degree $n$ having values such that $M(0)$ and $M(1)$ are the extremes of the desired range for $m$, and $M(u) \neq 0$ for all values on the interval $0 \leq u \leq 1$. Since different polynomials give rise to different systems having the same magnification range, it may be helpful to try several.

The following polynomial, for example, will result in an exponential characteristic for $m$ (i.e., the magnification will vary as an exponential function of the zoom actuator movement) which is desirable in many applications:

$$M(u) = 1 + Bu + \frac{(Bu)^2}{2!} + \frac{(Bu)^3}{3!} + \cdots + \frac{(Bu)^n}{n!}$$

where B is a constant chosen on the basis of the desired value of $M(1)$.

This polynomial is the truncated series expression for $e^{Bu}$ where $e$ is the symbol for the base of the Napierian logarithms. From elementary calculus, $$\frac{de^{Bu}}{du} = Be^{Bu}$$

This means that the value of $M(u)$ after zooming through a given increment $\delta_u$ would be equal to a constant multiplied by the value of $M(u)$ before zooming through the given increment, $\delta_u$, to an approximation depending upon B and the number of terms taken in the series. The number of terms depends on the number of lenses in the zoom system. For example, suppose that for the interval $0 \leq u \leq 1$, the coefficient B is chosen so that $M(1) = 32$. It would be found that at $$u = 0, \quad M(u) = 1$$
$$u = .2, \quad M(u) = 2$$
$$u = .4, \quad M(u) = 4$$
$$u = .6, \quad M(u) = 8$$
$$u = .8, \quad M(u) = 16$$
$$u = 1.0, \quad M(u) = 32$$

to the above mentioned approximation.

This series polynomial provides only one example of the many special properties that may be chosen for a linearly compensated zoom system by appropriate choice of the polynomial $M(u)$. Since the magnification is inversely proportional to M, it varies in the same manner as M.

For the purpose of obtaining a small spot size on the interval $0 \leq u \leq 1$, a polynomial of degree $n+1$ in $u$ is selected for $S(u)$ which will be small on this interval. One good choice is $T_{2n+2}(\sqrt{u})$ where T is the well-known Tchebycheff polynomial, of order $2n+2$ in $\sqrt{u}$. By way of illustration, for a three lens system, the Tchebycheff polynomial would be:

$$S(u) = T_8(\sqrt{u}) = \frac{1}{128}(128u^4 - 256u^3 + 160u^2 - 32u + 1)$$

The maximum size attained by $T_{2n+2}(\sqrt{u})$ is $2^{-(2n+1)}$, and when the maximum tolerable spot size is known for a given optical design, the entire optical system may be ratioed to bring $S(u)$ to the desired value.

GENERAL COMPUTATION STEP NO. 2

When $M(u)$ and $S(u)$ are chosen, successive divisions and inversions are performed to expand their quotient into a continued fraction of the form, (5)
$$\frac{S(u)}{M(u)} = e'(u) = r_n u + S_n + \cfrac{1}{r_{n-1}u + s_{n-1} + \cfrac{1}{\ddots + \cfrac{1}{r_0 u + s_0}}}$$

where the $r$'s and $s$'s are numbers resulting from the successive divisions and inversions.

GENERAL COMPUTATION STEP NO. 3

This fraction may be manipulated in conventional fashion. The numerator and denominator of any part may be multiplied by the same number without changing the value of the fraction. The first part of the manipulation affects the last level of the fraction only, and should be carried out first in order to ensure that the shift of focus and the magnification of the zoom system remain as defined by M and S throughout the full range. Multiply the numerator and denominator of the last stage of Equation 5 by A, where (6) $$A = \frac{1}{(r_0 r_1 \cdots r_n)^2}$$

Any other complete numerators and denominators of the fraction may then be multiplied by arbitrary multipliers to bring the numbers to reasonable sizes. Equations 5 and 3 may be matched to indicate what multipliers are needed. It is in these subsequent manipulations that attention must be given to satisfying predetermined conditions such as explained hereinabove relating to whether it is desired to effect image inversion or to maintain a constant object-to-image distance through the zoom range. When Equations 3 and 5 are matched, the $p$'s of Equation 3 are matched with the $r$'s of Equation 5 and the $X$'s of Equation 3 are matched with the $s$'s of Equation 5. Thus, when it is desired to maintain a constant object-to-image distance, the fraction should be manipulated to bring the sum of the $p$'s to zero, or as close thereto as possible.

GAUSSIAN BRACKET ANALYSIS

The first order layout of a linearly compensated zoom system may also be defined in terms of the known Gaussian bracket notation, which is helpful in analyzing and visualizing the properties of such a system, although it is not readily adaptable for use in deriving the values of the various parameters in the course of designing the first order layout.

The Gaussian bracket analysis may be set us as follows:

Given a sequence of $q+1$ algebraic or numeric quantities such as $a_0, a_1, a_2 \ldots a_{q-1}, a_q$ the sequence of $q+2$ brackets is defined as follows, $$[\ ], [a_0], [a_0, a_1], [a_0, a_1, a_2], \ldots [a_0, a_1 \ldots a_q]$$

where $[\ ] = 1$, $[a_0] = a_0$. In general, for the interval $1 \leq i \leq q$ $$[a_0, a_1 \ldots, a_{i-1}, a_i] = [a_0, a_1, \ldots a_{i-1}] a_i + [a_0, a_1 \ldots a_{i-2}]$$

as for example $[a_0, a_1] = [a_0] a_1 + [\ ] = a_0 a_1 + 1$

With reference to the functions $e'(u)$, $S(u)$ and $M(u)$ $$S(u) = [-D_0, K_1, -D_1, \ldots, K_n, -D_n]$$

$$M(u) = [-D_0 K_1, -D_1, \ldots, -D_{n-1}, K_n] \text{ and}$$

$$e'(u) = \frac{[-D_0, K_1, -D_1, K_2, -D_2 \ldots, -D_{n-1}, K_n, -D_n]}{[-D_0, K_1, -D_1, \ldots, -D_{n-1}, K_n]}$$

where $D_0, D_1 \ldots D_n$ are variables representing the separations of the zoom system through its zoom range. These expressions suggest a fundamental relationship in linearly compensated zoom syestems between image spot size and magnification, which are proportional to $S(u)$ and $M(u)$ respectively. These two factors $S(u)$ and $M(u)$ differ by only one term in otherwise identical Gaussian bracket sequences.

To illustrate the design procedure hereinabove given, a sample calculation for a three lens linearly compensated zoom system having a range of 4 to 1 and corresponding to the forms of the invention shown in FIGS. 3, 4, 6, and 11 will now be described.

EXAMPLE COMPUTATION STEP NO. 1

For $M(u)$ choose $2u^3 + u + 1$ since it is monotonic, has numerically simple coefficients, and gives $M(0) = 1$, $M(1) = 4$. For $S(u)$ choose the Tschebycheff polynominal, $$T_8(\sqrt{u}) = u^4 - 2u^3 + 1.25u^2 - 25u^2 + .0078125$$

EXAMPLE COMPUTATION STEP NO. 2

Dividing $S(u)$ by $M(u)$ yields the continued fraction, $$e'(u) = .5u - 1 + \cfrac{1}{2.666667u - .888889 + \cfrac{1}{-.511848u - .832865 + \cfrac{1}{-.566477u + .732891}}}$$

EXAMPLE COMPUTATION STEP NO. 3

Forming A according to Equation 6 yields $$A = \frac{1}{(.5)^2 (2.666667)^2 (-.511848)^2 (.566477)^2} = 6.690753$$

The last stage of the fraction (step 2) is multiplied by this number, yielding, $$e'(u) = .5u - 1 + \cfrac{1}{2.666667u - .888889 + \cfrac{1}{-.511848 - .832865 + \cfrac{6.690753}{-3.790158u + 4.903593}}}$$

Checking the sum of the $p$ coefficients that this equation gives when it is matched directly with Equation 3.

$$p_j = +.5 + 2.666667 + .511848 - 3.790158 = -1.111644$$

One relatively simple way to bring the sum of the $p$'s to zero (within achievable calculating accuracy) is to increase the second appearing coefficient of $u$, $$p_{n-1} = p_2 = 2.666667$$

by multiplying the stage in which it occurs as a denominator by the factor 1.416866, thus obtaining the fraction, $$e'(u) = .5u - 1 + \frac{1.416866}{\frac{3.778309u - 1.259436 + 1.416866}{\frac{-.511848u - .832865 + 6.690753}{-3.790158u + 4.903593}}}$$

The above calculation produces $\Sigma p_j = -0.000001$, and represents one possible solution to the problem of obtaining a zoom system having a 4 to 1 ratio.

The parameters of the lens system resulting from matching this last equation with Equation 3 are:

$f_1^2 = 6.690753$  $f_1 = \pm 2.586649$  $X_0 = +4.903593$
$f_2^2 = 1.416866$  $f_2 = \pm 1.190322$  $X_1 = +0.823865$
$f_3^2 = 1.416866$  $f_3 = \pm 1.190322$  $X_2 = -1.259436$

In making the determination as to whether the lenses should be negative or positive, it must be recognized that all of the separations except the first and the last must be positive throughout the zoom range, because there is as yet no practical arrangement for passing one lens through another in a zoom system.

The first separation, $d_0$, i.e., the separation between the object plane O (FIG. 8) and the first lens, and the last separation, $d_n$, i.e., the separation between the last lens and the image plane I may be negative only in those cases where the zoom system is to be operated in conjunction with one or more other optical devices so that the object plane or the image plane, or both need not be represented by tangible surfaces but may be aerial.

In the present case, when all of the separations are required to be positive through the entire zoom range, one solution is to select positive values for the focal lengths of all of the lenses. The separations then become (remembering that $D_j = X_j + f_j$):

$$D_0 = 7.490242 - 3.790158u$$
$$D_1 = 4.609836 - 0.511848u$$
$$D_2 = 1.121208 - 3.778309u$$
$$D_3 = 2.190322 - 0.500000u$$

A ray trace through this solution yields the following results:

When $u = 0$, $m = 0.999946$, and $e'(0) = 0.0078139$
When $u = 1$, $m = 3.994647$, and $e'(1) = 0.001953$ thus showing that agreement with the desired results is good.

The designer is thus enabled quickly and easily to develop all of the necessary parameters of a first order layout for a linearly compensated zoom system, and to check its image shift characteristic. The invention provides a direct, relatively simple, algebraic approach to a problem that is currently of major concern in the optical industry and that has previously been approached only on a cut and try basis.

The indices, radii, and other parameters of the system may then be determined by any convenient methods to provide the desired degree of aberration correction.

First order layouts and operating characteristics for typical linearly compensated zoom optical systems according to the invention are illustrated by the charts shown in FIGS. 10 through 14, which depict the respective characteristics in terms of the parameter $u$. These charts illustrate the lens excursions, the variations in the error, or image shift factor $e'(u)$ and the variations in magnification for linearly compensated zoom systems having, respectively, two, three, four, five, and six movable lenses. Each one of these systems has been computed for a constant object-to-image distance throughout its entire zoom range.

The differences in scale among the various charts shown in FIGS. 10–14 as they relate particularly to the image shift factor $e'(u)$ and the magnification factor $M(u)$ should be noted. Although the excursion of the image shift factor $e'(u)$ for the six movable lens system of FIG. 14 appears to be greater than the corresponding excursion for the two movable lens system of FIG. 10, it is actually less than one two-hundredth as large, despite the twelve and one-half times greater zoom range of the six movable lens system.

Figures 1, 2:
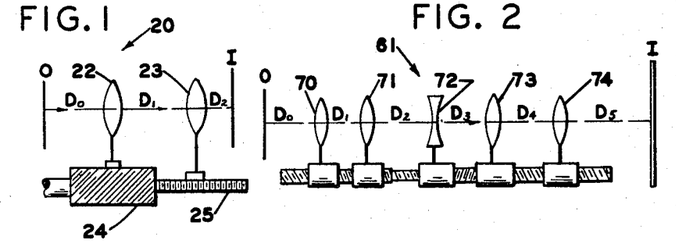
FIG. 1 is a diagrammatic view of a zoom optical system according to a first embodiment of the invention.
FIG. 2 is a diagrammatic view of a second embodiment of the invention.
Figures 1A, 5, 6, 7:
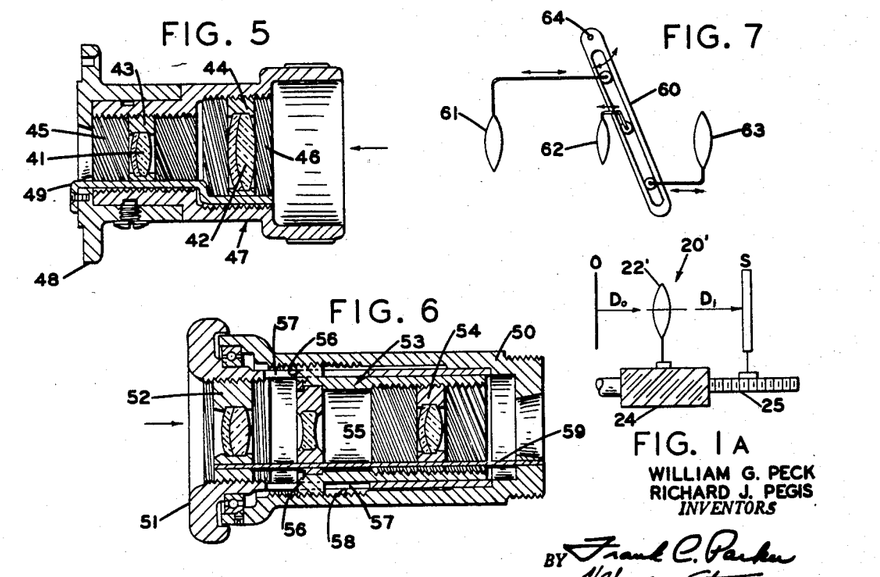
FIG. 1a is a diagrammatic view of a modification of the optical system shown in FIG. 1.
FIGS. 5 and 6 are longitudinal sectional views of alternative forms of zoom systems according to the invention.
FIG. 7 is a diagrammatic view of a mechanical arrangement for actuating a zoom system of the present invention.

Linearly compensated zoom systems including only two movable elements are shown schematically in FIGS. 1 and 1a.

Figure 10:
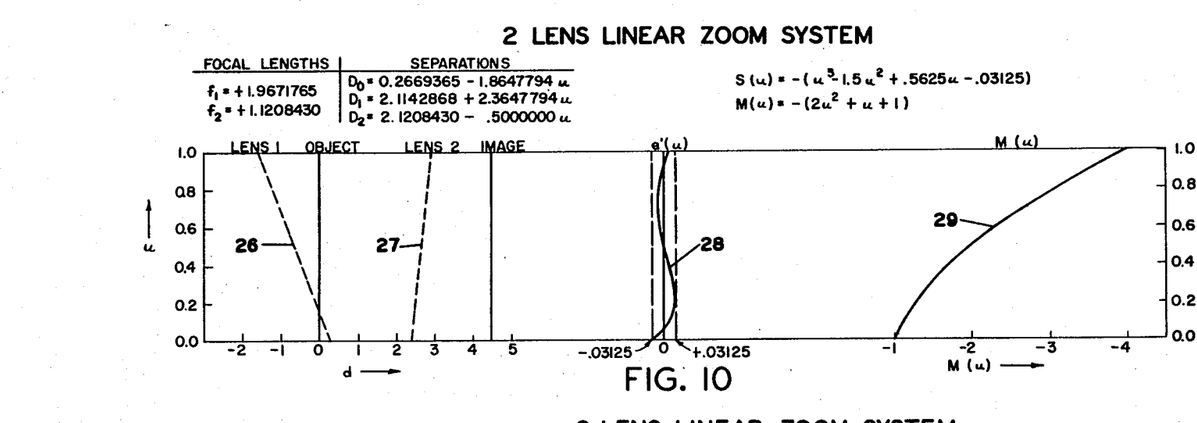
FIG. 10 is a chart showing the coordinated values of the first order parameters in a zoom system having two motions, as shown in FIG. 1.
Figure 11:
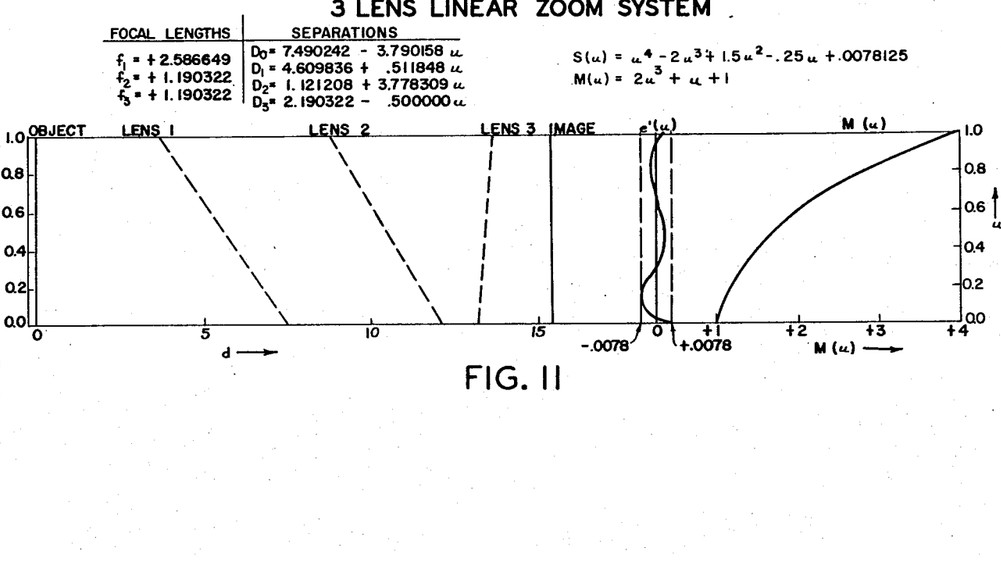
FIG. 11 is a chart showing the coordinated values of the first order parameters of a zoom system having three motions, such as the system shown in FIGS. 3 and 7.
Figure 12:
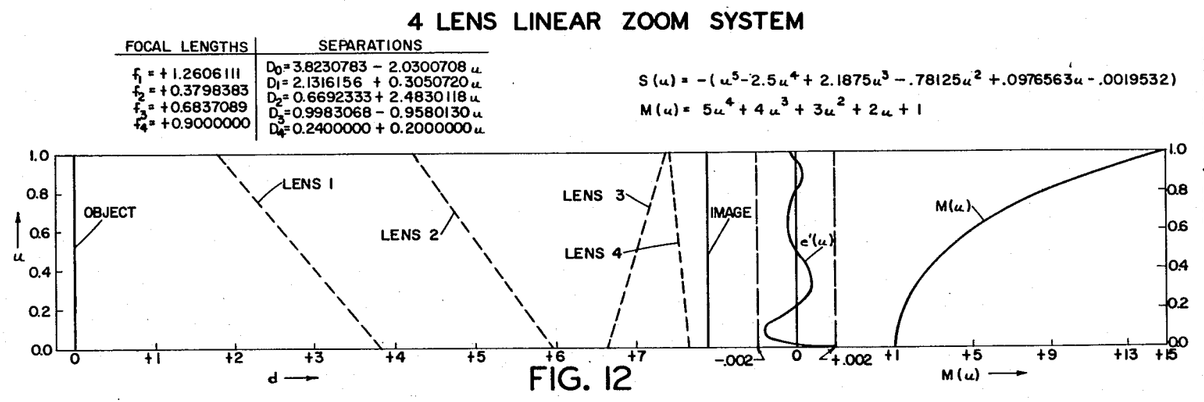
FIG. 12 is a chart similar to the chart of FIG. 10 but showing the first order parameters for a zoom system having four motions.

The system 20 shown in FIG. 1, similarly to the system defined in FIG. 10, includes two lenses 22 and 23 movable at different respective linearly related rates between an object plane O and an image plane I. The lenses 22 are drivable by respective screws 24 and 25 which are of different respective pitches and fixed to each other for rotation together.

The system 20' shown in FIG. 1a includes only one lens 22', and a screen S, both of which are movable relative to the object plane O. Similarly to the system shown in FIG. 1, the two linearly related motions are provided by screws 24 and 25, which are of different respective pitches and arranged for rotation together. The screen S defines the image plane for the system, and the object plane O serves as the fixed reference plane for the two motions.

This type of zoom system includes only three elements, the object plane O, the lens 22', and the image plane I, and is capable of only limited image shift compensation. A greater number of elements is required in order to achieve sufficient image shift compensation for most practical optical applications.

Figure 13:
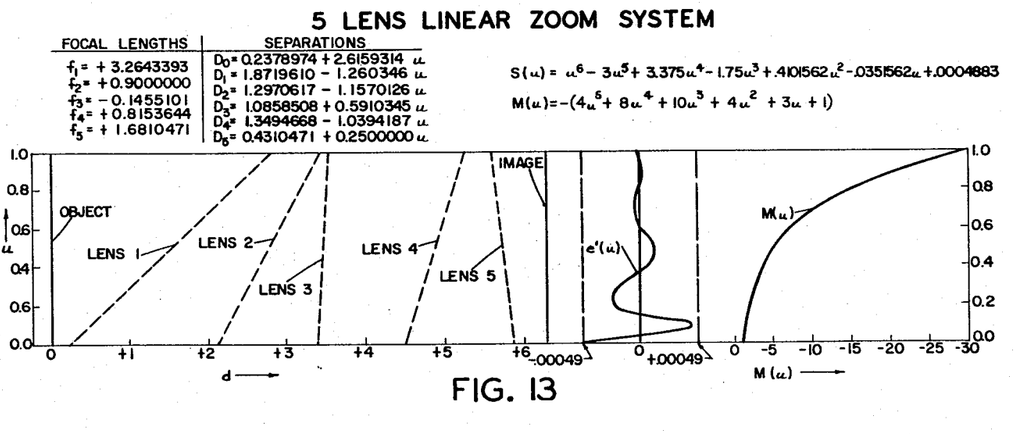
FIG. 13 is a chart similar to the chart of FIG. 10, but showing the first order parameters for a zoom system having five motions, such as the system shown in FIG. 2.
Figure 14:
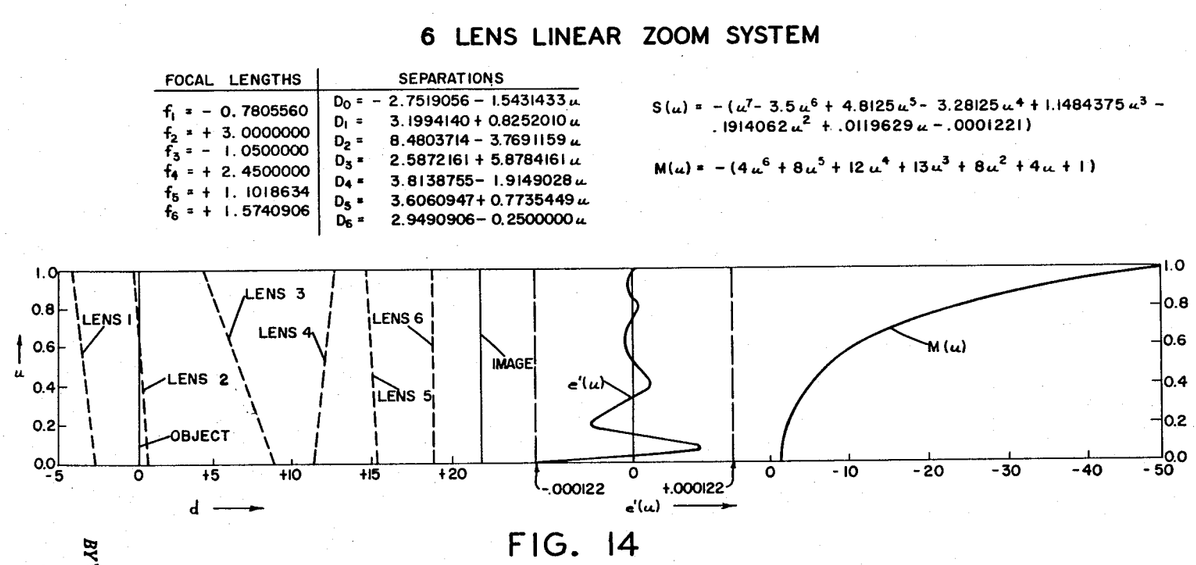
FIG. 14 is a chart similar to the chart of FIG. 10, but showing the first order parameters for a zoom system having six motions, such as the system shown in FIG. 2.

The linearly compensated zoom system shown in FIG. 2 is arranged to operate with a fixed object-to-image distance, and includes five movable lenses 70, 71, 72, 73, and 74, respectively. One set of first order constants for the system is shown in FIG. 13 for achieving a zoom range of thirty to one. It will be noted that the maximum image shift for the system as defined in FIG. 13 is less than four tenths of one per cent of the focal length of the shortest focal length lens in the system.

Figures 3, 4:
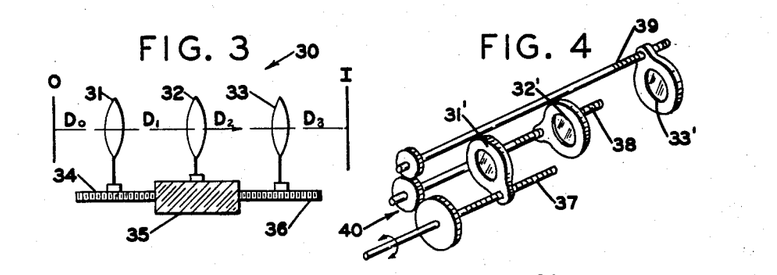
FIG. 3 is a diagrammatic view of a third embodiment of the invention.
FIG. 4 is a partly schematic, perspective view of certain mechanical and optical elements for effecting the practice of the invention.

FIG. 3 illustrates a linear zoom system including three movable lenses 31, 32, and 33 arranged between relatively fixed object and image surfaces O and I, respectively. The first order constants for this system may be those illustrated in FIG. 11 for a zoom range of four, resulting in a maximum image shift of about six and one-half percent of the focal length of the shortest focal length lens of the system.

FIGS. 4, 5, 6, and 7 illustrate various different mechanical arrangements for accomplishing the linearly related motions in various different specific zoom systems according to the invention. In FIG. 4, the three lenses 31', 32', and 33' are drivable by three similar drive screws 37, 38, and 39, respectively, which are geared together by the gear train 40 to provide the desired linear relationship between their rates of rotation, and, consequently, between the rates of axial movement of the lenses.

In FIG. 5, a two lens system is shown, the lenses 41 and 42 being mounted within respective externally threaded rings 43 and 44, which engage the differently pitched internal threads 45 and 46 of the lens barrel 47. The barrel 47 is rotatable in a mounting flange 48, by which the assembly may be mounted upon a camera, projector, or other device with which it is to be used. An arm 49 is fixed to the mounting flange 48, and extends axially through the barrel 47 through notches (not separately designated) in the rings 43 and 44 for holding the rings against rotation.

The arrangement shown in FIG. 6 is for a three movable lens system, and includes a mounting or main barrel 50 for direct, fixed attachment to a device such as a camera or the like. A zoom control barrel 51 is rotatable within the main barrel 50, and is internally threaded to receive the front lens mounting ring 52. An auxiliary barrel 53 is splined to the control barrel 51 and is axially slidable therein. The rear lens mounting ring 54 is threadedly engaged within the auxiliary barrel 53. The middle lens mounting ring 55 is rotatable in an annular groove (not separately designated) in the auxiliary barrel 53. Lugs 56 extend radially from the auxiliary barrel 53 through longitudinal slots 57 in the control barrel 51 into threaded engagement with an internal thread 58 in the main barrel 50. A retainer 59 fixed to the main barrel 50 extends through all of the lens mounting rings 52, 54, 55 and holds them against rotation.

In this arrangement, the control barrel 51 drives the front lens mounting ring 52 and rotates the auxiliary barrel 53, which carries the middle lens mounting ring 55, and which also drives the rear lens mounting ring 54, thereby achieving three linearly related motions. The relationships between the three motions may be those illustrated in FIG. 11.

FIG. 7 illustrates a relatively simple, pivoted lever arrangement for moving three lenses of a linear zoom system of the invention. In this arrangement, the various different lens mounts 61, 62, and 63 are engaged by the lever 60 at different respective distances from the fixed pivot 64 to provide the linearly related motions.

Figure 15:
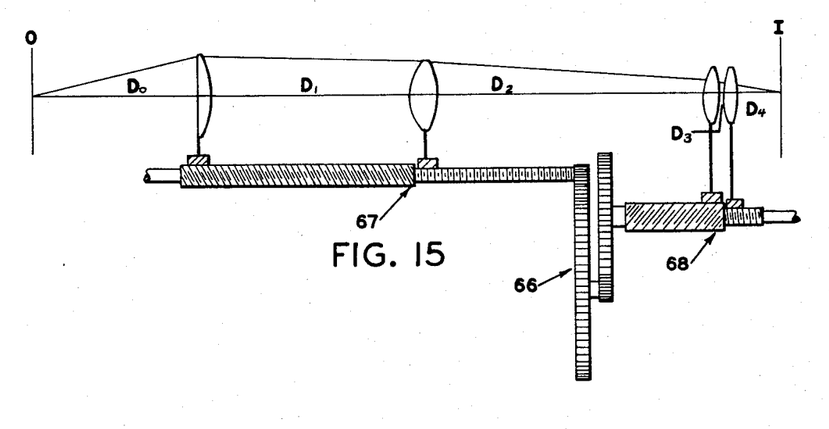
FIG. 15 is an optical diagram of a four motion zoom system in accordance with the chart shown in FIG. 12.

FIG. 15 illustrates yet another mechanical drive arrangement for providing linear compensation in a zoom system according to the invention. The system shown in FIG. 15 corresponds to the four lens system outlined in the chart of FIG. 12, and the gear train 66 connecting the two double screws 67 and 68, respectively, is ratioed to permit the use of reasonably closely pitched threads on the screws 67 and 68.

The illustrative first order layouts according to the invention that are shown in FIGS. 10–14 of the drawings are recapitulated in the following Tables for convenient reference.

*Two lens system*

Object/image distance: 4.5020663
Magnification range: 4 to 1
Max. image shift: .03125
$S(u) = -(u^3 - 1.5u^2 + .5625u - .03125)$
$M(u) = -(2u^2 + u + 1)$
$f_{lens\ 1} = +1.9671765$
$f_{lens\ 2} = +1.1208430$
Separation $D_0 = 0.2669365 - 1.8647794u$
Separation $D_1 = 2.1142868 + 2.3647794u$
Separation $D_2 = 2.1208430 - .5000000u$

*Three lens system*

Object/image distance: 15.411608
Magnification range: 4 to 1
Max. image shift: .0078
$S(u) = u^4 - 2u^3 + 1.5u^2 - .25u + .0078125$
$M(u) = 2u^3 + u + 1$
$f_{lens\ 1} = +2.586649$
$f_{lens\ 2} = +1.190322$
$f_{lens\ 3} = +1.190322$
Separation $D_0 = 7.490242 - 3.790158u$
Separation $D_1 = 4.609836 + .511848u$
Separation $D_2 = 1.121208 + 3.778309u$
Separation $D_3 = 2.190322 - .500000u$

*Four lens system*

Object/image distance: 7.8622340
Magnification range: 15 to 1
Max. image shift: .002
$S(u) = -(u^5 - 2.5u^4 + 2.1875u^3$
$\qquad - .78125u^2 + .0976563u - .0019532)$
$M(u) = 5u^4 + 4u^3 + 3u^2 + 2u + 1$
$f_{lens\ 1} = +1.2606111$
$f_{lens\ 2} = +0.3798383$
$f_{lens\ 3} = +0.6837089$
$f_{lens\ 4} = +0.9000000$
Separation $D_0 = 3.8230783 - 2.0300708u$
Separation $D_1 = 2.1316156 + 0.3050720u$
Separation $D_2 = 0.6692333 + 2.4830118u$
Separation $D_3 = 0.9983068 - 0.9580130u$
Separation $D_4 = 0.2400000 + 0.2000000u$

*Five lens system*

Object/image distance: 6.2732848
Magnification range: 30 to 1
Max. image shift: .00049
$S(u) = u^6 - 3u^5 + 3.375u^4 - 1.75u^3$
$\qquad + .4101562u^2 - .0351562u + .0004883$
$M(u) = -(4u^5 + 8u^4 + 10u^3 + 4u^2 + 3u + 1)$
$f_{lens\ 1} = +3.2643393$
$f_{lens\ 2} = +0.9000000$
$f_{lens\ 3} = -0.1455101$
$f_{lens\ 4} = +0.8153644$
$f_{lens\ 5} = +1.6810471$
Separation $D_0 = 0.2378974 + 2.6159314u$
Separation $D_1 = 1.8719610 - 1.260346u$
Separation $D_2 = 1.2970617 - 1.1570126u$
Separation $D_3 = 1.0858508 + 0.5910345u$
Separation $D_4 = 1.3494668 - 1.0394187u$
Separation $D_5 = 0.4310471 + 0.2500000u$

*Six lens system*

Object/image distance: 21.8841567
Magnification range: 50 to 1
Max. image shift: .000122
$S(u) = -(u^7 - 3.5u^6 + 4.8125u^5 - 3.28125u^4$
$\qquad + 1.1484375u^3 - .1914062u^2 + .0119629u - .0001221)$
$M(u) = -(4u^6 + 8u^5 + 12u^4 + 13u^3 + 8u^2 + 4u + 1)$
$f_{lens\ 1} = -0.7805560$
$f_{lens\ 2} = +3.0000000$
$f_{lens\ 3} = -1.0500000$
$f_{lens\ 4} = +2.4500000$
$f_{lens\ 5} = +1.1018634$
$f_{lens\ 6} = +1.5740906$
Separation $D_0 = -2.7519056 - 1.5431433u$
Separation $D_1 = 3.1994140 + 0.8252010u$
Separation $D_2 = 8.4803714 - 3.7691159u$
Separation $D_3 = 2.5872161 + 5.8784161u$
Separation $D_4 = 3.8138755 - 1.9149028u$
Separation $D_5 = 3.6060947 + 0.7735449u$
Separation $D_6 = 2.9490906 - 0.2500000u$

What is claimed is:

1. The combination in a zoom optical system of a plurality of optically aligned, mutually spaced and axially movable lens members, a stationary object surface of which said members form an image at a variable magnification, and a corresponding plurality of interconnected linear drive mechanisms which are individually connected to said members and are so operatively constructed and arranged as to provide the dual functions of continuously and progressively varying the magnifications of said image and simultaneously compensating the axial shift of said image position such that it is held within optimal small and predictable limits by moving all of said lens members simultaneously at different linearly related optimum rates with reference to said surface during movement through the magnification range, the construction of said mechanisms and the respective values of focal lengths and the sign thereof as well as the values of the axial spaces lying between said object surface and image being specified by the mathematical expressions herebelow, $$e'(u) = \frac{S(u)}{M(u)} = \frac{[-D_0, K_1, -D_1, K_2, -D_2, \cdots, K_n, -D_n]}{[-D_0, K_1, -D_1, K_2, -D_2, \cdots, -D_{n-1}, K_n}$$

wherein

[ ] are Gaussian brackets, $n$ is the number of lenses in said system, $e'(u)$ gives the position of the image with respect to its position at $u=0$ (and represents the image shift away from the desired plane), $u$ is a mathematical parameter which is chosen such that $0 \leqslant u \leqslant 1$, the value of $u$ thus being given at any point in the zooming movement of said members by the ratio of the distance traveled by the members at that point in said movement to the total distance traveled by said members corresponding to the complete magnification range, $S(u)$ is a polynomial of degree $n+1$ in $u$ having relatively small values on the interval over which $u$ varies, $M(u)$ gives the reciprocal of the magnification for any value of $u$, $D_0$ represents the space from said object surface to the first lens member, and $D_0 = d_0 + p_0 u$ wherein $d_0$ is the first space at $u=0$, $p_0$ is the total change in space $D_0$ going from $u=0$ to $u=1$, $D_i$ represents the space between the first lens member and the $i$th lens member, $$D_i = d_i + p_i u \ (1 \leqslant i \leqslant n)$$

wherein $d_i$ is the space between the $i$th and $i+1$st lens at $u=0$ and $p_i$ is the total change in space $D_i$ going from $u=0$ to $u=1$, $K_i=1/f_i$, wherein $f_i$ is the focal length of the $i$th lens $(1 \leqslant i \leqslant n)$, said zoom optical system being further characterized by the following specific values $n=2$
$S(u) = -(u^3 - 1.5u^2 + .5625u - .03125)$
$M(u) = -(2u^2 + u + 1)$

| Focal lengths | Separations |
|---|---|
| $f_1 = +1.9671765$ | $D_0 = 0.2669365 - 1.8647794\ u$ |
| $f_2 = +1.1208430$ | $D_1 = 2.1142868 + 2.3647794\ u$ |
| | $D_2 = 2.1208430 - .5000000\ u$ |

$n$ denotes the number of movable zoom lens members, $f_1$ and $f_2$ represent the respective focal lengths of said members, and $D_0$ to $D_2$ represent the successive axial lens spacings between the object and image.

2. The combination in a zoom optical system of a plurality of optically aligned, mutually spaced and axially movable lens members, a stationary object surface of which said members form an image at a variable magnification, and a corresponding plurality of interconnected linear drive mechanisms which are individually connected to said members and are so operatively constructed and arranged as to provide the dual functions of continuously and progressively varying the magnification of said image and simultaneously compensating the axial shift of said image position such that it is held within optimal small and predictable limits by moving all of said lens members simultaneously at different linearly related optimum rates with reference to said surface during movement through the magnification range, the construction of said mechanisms and the respective values of focal lengths and the sign thereof as well as the values of the axial spaces lying between said object surface and image being specified by the mathematical expressions herebelow, $$e'(u) = \frac{S(u)}{M(u)} = \frac{[-D_0, K_1, -D_1, K_2, -D_2, \cdots, K_n, -D_n]}{[-D_0, K_1, -D_1, K_2, -D_2, \cdots, -D_{n-1}, K_n]}$$

wherein

[ ] are Gaussian brackets, $n$ is the number of lenses in said system, $e'(u)$ gives the position of the image with respect to its position at $u=0$ (and represents the image shift away from the desired plane), $u$ is a mathematical parameter which is chosen such that $0 \leq u \leq 1$, the value of $u$ thus being given at any point in the zooming movement of said members by the ratio of the distance traveled by the members at that point in said movement to the total distance traveled by said members corresponding to the complete magnification range, $S(u)$ is a polynomial of degree $n+1$ in $u$ having relatively small values on the interval over which $u$ varies, $M(u)$ gives the reciprocal of the magnification for any value of $u$, $D_0$ represents the space from said object surface to the first lens member, and $D_0 = d_0 + p_0 u$ wherein $d_0$ is the first space at $u=0$, $p_0$ is the total change in space $D_0$ going from $u=0$ to $u=1$, $D_i$ represents the space between the first lens member and the $i$th lens member, $$D_i = d_i + p_i u \ (1 \leq i \leq n)$$

wherein $d_i$ is the space between the $i$th and $i+1$st lens at $u=0$ and $p_i$ is the total change in space $D_i$ going from $u=0$ to $u=1$, $K_i = 1/f_i$, wherein $f_i$ is the focal length of the $i$th lens $(1 \leq i \leq n)$, said zoom optical system being further characterized by the following specific values $n=3$
$S(u) = u^4 - 2u^3 + 1.5u^2 - .25u + .0078125$
$M(u) = 2u^3 + u + 1$

| Focal Lengths | Separations |
|---|---|
| $f_1 = +2.586649$ | $D_0 = 7.490242 - 3.790158\ u$ |
| $f_2 = +1.190322$ | $D_1 = 4.609836 + .511848\ u$ |
| $f_3 = +1.190322$ | $D_2 = 1.121208 + 3.778309\ u$ |
| | $D_3 = 2.190322 - .5000000\ u$ | wherein $n$ denotes the number of movable zoom lens members, $f_1$ to $f_3$ represent the respective focal lengths of said members, and $D_0$ to $D_3$ represent the successive axial lens spacings between the object and image.

3. The combination in a zoom optical system of a plurality of optically aligned, mutually spaced and axially movable lens members, a stationary object surface of which said members form an image at a variable magnification, and a corresponding plurality of interconnected linear drive mechanisms which are individually connected to said members and are so operatively constructed and arranged as to provide the dual functions of continuously and progressively varying the magnification of said image and simultaneously compensating the axial shift of said image position such that it is held within optimal small and predictable limits by moving all of said lens members simultaneously at different linearly related optimum rates with reference to said surface during movement through the magnification range, the construction of said mechanisms and the respective values of focal lengths and the sign thereof as well as the values of the axial spaces lying between said object surface and image being specified by the mathematical expressions herebelow, $$e'(u) = \frac{S(u)}{M(u)} = \frac{[-D_0, K_1, -D_1, K_2, -D_2, \cdots, K_n, -D_n]}{[-D_0, K_1, -D_1, K_2, -D_2, \cdots -D_{n-1}, K_n]}$$

wherein

[ ] are Gaussian brackets, $n$ is the number of lenses in said system, $e'(u)$ gives the position of the image with respect to its position at $u=0$ (and represents the image shift away from the desired plane), $u$ is a mathematical parameter which is chosen such that $0 \leq u \leq 1$, the value of $u$ thus being given at any point in the zooming movement of said members by the ratio of the distance traveled by the members at that point in said movement to the total distance traveled by said members corresponding to the complete magnification range, $S(u)$ is a polynomial of degree $n+1$ in $u$ having relatively small values on the interval over which $u$ varies, $M(u)$ gives the reciprocal of the magnification for any value of $u$, $D_0$ represents the space from said object surface to the first lens member, and $D_0 = d_0 + p_0 u$ wherein $d_0$ is the first space at $u=0$, $p_0$ is the total change in space $D_0$ going from $u=0$ to $u=1$, $D_i$ represents the space between the first lens member and the $i$th lens member, $$D_i = d_i + p_i u \quad (1 \leq i \leq n)$$

wherein $d_i$ is the space between the $i$th and $i+1$st lens at $u=0$ and $p_i$ is the total change in space $D_i$ going from $u=0$ to $u=1$, $K_i = 1/f_i$, wherein $f_i$ is the focal length of the $i$th lens $(1 \leq i \leq n)$, said zoom optical system being further characterized by the following specific values $$n=4$$
$$S(u) = -(u^5 - 2.5u^4 + 2.1875u^3 - .78125u^2 + .0976563u - .0019532)$$
$$M(u) = 5u^4 + 4u^3 + 3u^2 + 2u + 1$$

| Focal lengths | Separations |
|---|---|
| $f_1 = +1.2606111$ | $D_0 = 3.8230783 - 2.0300708\ u$ |
| $f_2 = +0.3798383$ | $D_1 = 2.1316156 + 0.3050720\ u$ |
| $f_3 = +0.6837089$ | $D_2 = 0.6692333 + 2.4830118\ u$ |
| $f_4 = +0.9000000$ | $D_3 = 0.9983068 - 0.9580130\ u$ |
| | $D_4 = 0.2400000 + 0.2000000\ u$ |

$n$ denotes the number of movable zoom lens members, $f_1$ to $f_4$ represent the respective focal lengths of said members, and $D_0$ to $D_4$ represent the successive axial lens spacings between the object and image.

4. The combination in a zoom optical system of a plurality of optically aligned, mutually spaced and axially movable lens members, a stationary object surface of which said members form an image at a variable magnification, and a corresponding plurality of interconnected linear drive mechanisms which are individually connected to said members and are so operatively constructed and arranged as to provide the dual functions of continuously and progressively varying the magnification of said image and simultaneously compensating the axial shift of said image position such that it is held within optimal small and predictable limits by moving all of said lens members simultaneously at different linearly related optimum rates with reference to said surface during movement through the magnification range, the construction of said mechanisms and the respective values of focal lengths and the sign thereof as well as the values of the axial spaces lying between said object surface and image being specified by the mathematical expressions herebelow, $$e'(u) = \frac{S(u)}{M(u)} = \frac{[-D_0, K_1, -D_1, K_2, -D_2, \cdots, K_n, -D_n]}{[-D_0, K_1, -D_1, K_2, -D_2, \cdots, -D_{n-1}, K_n]}$$

wherein

[ ] are Gaussian brackets, $n$ is the number of lenses in said system, $e'(u)$ gives the position of the image with respect to its position at $u=0$ (and represents the image shift away from the desired plane), $u$ is a mathematical parameter which is chosen such that $0 \leq u \leq 1$, the value of $u$ thus being given at any point in the zooming movement of said members by the ratio of the distance traveled by the members at that point in said movement to the total distance traveled by said members corresponding to the complete magnification range, $S(u)$ is a polynomial of degree $n+1$ in $u$ having relatively small values on the interval over which $u$ varies, $M(u)$ gives the reciprocal of the magnification for any value of $u$, $D_0$ represents the space from said object surface to the first lens member, and $D_0 = d_0 + p_0 u$ wherein $d_0$ is the first space at $u=0$, $p_0$ is the total change in space $D_0$ going from $u=0$ to $u=1$, $D_i$ represents the space between the first lens member and the $i$th lens member, $$D_i = d_i + p_i u \quad (1 \leq i \leq n)$$

wherein $d_i$ is the space between the $i$th and $i+1$st lens at $u=0$ and $p_i$ is the total change in space $D_i$ going from $u=0$ to $u=1$, $K_i = 1/f_i$, wherein $f_i$ is the focal length of the $i$th lens $(1 \leq i \leq n)$, said zoom optical system being further characterized by the following specific values $$n=5$$
$$S(u) = u^6 - 3u^5 + 3.375u^4 - 1.75u^3 + .4101562u^2 - .0351562u + .0004883$$
$$M(u) = -(4u^5 + 8u^4 + 10u^3 + 4u^2 + 3u + 1)$$

| Focal lengths | Separations |
|---|---|
| $f_1 = +3.2643393$ | $D_0 = 0.2378974 + 2.6159314\ u$ |
| $f_2 = +0.9000000$ | $D_1 = 1.8719610 - 1.260346\ u$ |
| $f_3 = -0.1455101$ | $D_2 = 1.2970617 - 1.570126\ u$ |
| $f_4 = +0.8153644$ | $D_3 = 1.0858508 + 0.5910345\ u$ |
| $f_5 = +1.6810471$ | $D_4 = 1.3494668 - 1.0394187\ u$ |
| | $D_5 = 0.4310471 + 0.2500000\ u$ |

$n$ denotes the number of movable zoom lens members, $f_1$ to $f_5$ represent the respective focal lengths of said members, and $D_0$ to $D_5$ represent the successive axial lens spacings between the object and image.

5. The combination in a zoom optical system of a plurality of optically aligned, mutually spaced and axially movable lens members, a stationary object surface of which said members form an image at a variable magnification, and a corresponding plurality of interconnected linear drive mechanisms which are individually connected to said members and are so operatively constructed and arranged as to provide the dual functions of continuously and progressively varying the magnification of said image and simultaneously compensating the axial shift of said image position such that it is held within optimal small and predictable limits by moving all of said lens members simultaneously at different linearly related optimum rates with reference to said surface during movement through the magnification range, the construction of said mechanisms and the respective values of focal lengths and the sign thereof as well as the values of the axial spaces lying between said object surface and image being specified by the mathematical expressions herebelow, $$e'(u) = \frac{S(u)}{M(u)} = \frac{[-D_0, K_1, -D_1, K_2, -D_2, \cdots, K_n, -D_n]}{[-D_0, K_1, -D_1, K_2, -D_2, \cdots, -D_{n-1}, K_n]}$$

wherein

[ ] are Gaussian brackets, $n$ is the number of lenses in said system, $e'(u)$ gives the position of the image with respect to its position at $u=0$ (and represents the image shift away from the desired plane), $u$ is a mathematical parameter which is chosen such that $0 \leq u \leq 1$, the value of $u$ thus being given at any point in the zooming movement of said members by the ratio of the distance traveled by the members at that point in said movement to the total distance traveled by said members corresponding to the complete magnification range, $S(u)$ is a polynomial of degree $n+1$ in $u$ having relatively small values on the interval over which $u$ varies, $M(u)$ gives the reciprocal of the magnification for any value of $u$, $D_0$ represents the space from said object surface to the first lens member, and $D_0 = d_0 + p_0 u$ wherein $d_0$ is the first space at $u=0$, $p_0$ is the total change in space $D_0$ going from $u=0$ to $u=1$, $D_i$ represents the space between the first lens member and the $i$th lens member, $$D_i = d_i + p_i u \quad (1 \leq i \leq n)$$

wherein $d_i$ is the space between the $i$th and $i+1$st lens at $u=0$ and $p_i$ is the total change in space $D_i$ going from $u=0$ to $u=1$, $K_i = 1/f_i$, wherein $f_i$ is the focal length of the $i$th lens $(1 \leq i \leq n)$, said zoom optical system being further characterized by the following specific values $$n=6$$

$$S(u) = -(u^7 - 3.5u^6 + 4.8125u^5 - 3.28125u^4 + 1.1484375u^3 - .1914062u^2 + .0119629u - .0001221)$$

$$M(u) = -(4u^6 + 8u^5 + 12u^4 + 13u^3 + 8u^2 + 4u + 1)$$

| Focal lengths | Separations |
|---|---|
| $f_1 = -0.7805560$ | $D_0 = -2.7519056 - 1.5431433\,u$ |
| $f_2 = +3.0000000$ | $D_1 = 3.1994140 + 0.8252010\,u$ |
| $f = -1.0500000$ | $D_2 = 8.4803714 - 3.7691159\,u$ |
| $f_4 = +2.4500000$ | $D_3 = 2.5872161 + 5.8784161\,u$ |
| $f_5 = +1.1018634$ | $D_4 = 3.8138755 - 1.9149028\,u$ |
| $f_6 = +1.5740906$ | $D_5 = 3.6060947 + 0.7735449\,u$ |
|  | $D_6 = 2.9490906 - 0.2500000\,u$ |

$n$ denotes the number of movable zoom lens members, $f_1$ to $f_6$ represent the respective focal lengths of said members, and $D_0$ to $D_6$ represent the successive axial lens spacings between the object and image.

References Cited by the Examiner
UNITED STATES PATENTS

| | | | |
|---|---|---|---|
| 2,235,364 | 3/41 | Gramatzki | 88—57 |
| 2,924,146 | 2/60 | Back | 88—57 |
| 2,952,186 | 9/60 | Parenti | 88—57 |
| 2,959,101 | 11/60 | Sandbock et al. | 88—57 |

FOREIGN PATENTS 449,434    6/36    Great Britain.

JEWELL H. PEDERSEN, *Primary Examiner.*

EMIL G. ANDERSON, *Examiner.*

UNITED STATES PATENT OFFICE
CERTIFICATE OF CORRECTION

Patent No. 3,185,029                              May 25, 1965

William G. Peck et al.

It is hereby certified that error appears in the above numbered patent requiring correction and that the said Letters Patent should read as corrected below.

Column 4, line 61, for "amplies" read -- implies --; column 5, line 4, before "e′(u)=" insert -- (3) --; line 24, strike out "$X_0=d_0-f_1$"; line 25, for "(1$\leq$ $\leq$n-1$\leq$" read -- (1$\leq$j$\leq$n-1) --; column 8, line 1, for "us" read -- up --; column 18, in the table, first column, line 3 thereof, for "f=" read -- $f_3=$ --.

Signed and sealed this 14th day of December 1965.

(SEAL)
Attest:

ERNEST W. SWIDER                              EDWARD J. BRENNER
Attesting Officer                                   Commissioner of Patents